United States Patent [19]
Miyashita

[11] Patent Number: 5,124,601
[45] Date of Patent: Jun. 23, 1992

[54] STEEPING MOTOR
[75] Inventor: Takashi Miyashita, Kanagawa, Japan
[73] Assignee: Fuji Electric Co., Ltd., Kanagawa, Japan
[21] Appl. No.: 705,031
[22] Filed: May 21, 1991
[30] Foreign Application Priority Data
  May 22, 1990 [JP] Japan .................. 2-131891
[51] Int. Cl.⁵ .............................................. H02K 5/24
[52] U.S. Cl. ...................................... 310/51; 310/43; 310/45; 310/49 R; 74/574
[58] Field of Search ............... 310/49 R, 51, 43, 45, 310/261, 268, 162, 42; 74/574; 336/100

[56] References Cited
U.S. PATENT DOCUMENTS

| | | |
|---|---|---|
| 3,226,579 | 12/1965 | Bygdnes .................. 310/51 |
| 3,230,404 | 1/1966 | Graham .................. 310/51 |
| 4,617,484 | 10/1986 | Buijsen .................. 310/51 |
| 4,734,804 | 3/1988 | Shuichi Hanabusa . |

FOREIGN PATENT DOCUMENTS
0021299 9/1969 Japan .

Primary Examiner—R. Skudy
Attorney, Agent, or Firm—Finnegan, Henderson, Farabow, Garrett and Dunner

[57] ABSTRACT

A stepping motor having a stationary portion, a rotary portion supported on said stationary portion, and a smoothing device including a flexible member having an inside portion and a circumferential edge portion. The flexible member is made of a soft elastic body flexible in the direction of rotation of the stepping motor, and an annular inertia member is fixed on the circumferential edge portion of said flexible member. The smoothing device is mounted on the rotary portion of the stepping motor at the inside portion of the flexible member.

7 Claims, 2 Drawing Sheets

STEEPING MOTOR

BACKGROUND OF THE INVENTION

1. Field of the Invention

The present invention relates to stepping motors and, more particularly, it relates to a stepping motor especially suitable for positioning a read/write head of a disk storage device.

2. Description of the Related Art

Stepping motors are commonly used for accurately positioning various components, such as the read/write head of a disk storage device, so as to move the component through a desired distance and then stop the driven component at a desired precise position. To this end, designers of stepping motors have searched for ways in which to improve the velocity and accuracy of stepping motor operation.

Stepping motors are made with a multi-phase winding structure, usually a two phase winding, so that the rotor thereof is rotated in step increments of a small angle whenever a current vector supplied to the multiphase coil is switched. Theoretically, the stepping motor velocity can be increased with increased current vector switching and positioning accuracy can be increased with reduction in the rotational angle of each stepping increment. Both stepping motor speed and positioning accuracy, however, require that the inertia of the driven component be matched with the torque developed by the stepping motor. For example, in the operation of a read/write head of a disk storage device, a mechanical coupling between the head and the stepping motor is kept as light as possible so that the head positioning operation can be performed by a small, low inertia stepping motor to move the head through the required maximum distance relative to the disk surface in approximately 40-50 milliseconds. The positional area of the head falls within the range of from 2-3 μm.

If it is attempted to shorten the head moving time to about a period on the order of 20 milliseconds, for example, by increasing the operating velocity of the stepping motor, the actual time required to move and stop the head at a target position cannot be reduced with further reduction in mass of the mechanical coupling system alone. This is because the head oscillates before and after a target position is reached, thus requiring time for the head to become stopped in a stable condition. The oscillation is caused by fluctuations in the rotating velocity of the stepping motor as may be appreciated from FIGS. 5 and 6 of the accompanying drawings.

In FIG. 5, a theoretical schedule of the velocity v relative to the minimum time t required for moving a read/write head by a predetermined distance is designated Vs. As shown, the velocity schedule Vs is trapezoidal in shape so that the head is accelerated with the full torque of the stepping motor from a time t0 to a time t1. The head maintains a constant velocity from the time t1 to the time t2. Finally, the head is decelerated with full torque of the stepping motor from the time t2 to the time t3.

In the period of time from the time t1 to the time t2, however, a wave is generated in the curve Va representing actual velocity of the head in FIG. 5. Although the acceleration and deceleration represented by the wave is not wanted during this period of time, such variations in velocity are the result of rotational fluctuations in the stepping motor caused by switching the phase current vector. The influence of the rotational fluctuations thus appear as fluctuations in an intended constant velocity. Accordingly, the actual velocity Va of the head becomes different from the scheduled Vs at the time t2 from which the head is to be decelerated. For example, if the actual velocity Va is high at the time t2, as shown in the drawing, deceleration of the head is correspondingly delayed.

FIG. 6 is a graph in which the moving distance x of the head is related to time t. If the deceleration is delayed as described above, the actual moving distance x of the head, up to the time t3, at the end of the scheduled deceleration period, becomes larger than the scheduled distance xs. This means that the head passes through the target position existing at the scheduled distance xs. That is, after the time t3, the head oscillates before and after the target position as shown in FIG. 6 and stops at the target position at a time t4 which is considerably delayed.

Although it is assumed that the actual velocity Va is higher than the scheduled velocity Vs at the time t2 when deceleration is initiated in the example of FIG. 5, the actual velocity Va could be lower than the scheduled velocity Vs. Although in this latter case, deceleration begins sooner, oscillations generated after the time t3 cause the driven component to move before and after the target position, giving rise to the same delay represented in FIG. 6.

As may be appreciated from the above description, if the inertia of the driven component is reduced to increase operating velocity, the influence of the rotational fluctuations of the stepping motor have a greater effect on velocity variations of the driven component. Accordingly, increasing the operating velocity of the stepping motor is of limited effect in shortening the actual operating time required to move and position the driven component.

In light of the limitations on the speed of positioning movement using a stepping motor, the problem has been addressed by attaching a damper to the stepping motor so as to absorb the rotational fluctuations of the motor. An example of a stepper motor including such a damper is shown in FIG. 7 of the drawings.

In FIG. 7, a stepping motor 10 is shown in which a stator, having magnetic poles 2 and coils 3 wound on the magnetic poles 2, is housed in a casing 1. A rotor, including a pair of iron rotor cores 6 and a magnetic-flux generating permanent magnet 7, is mounted on a shaft 5 supported by the casing 1 through bearings 4. Provided under the stepping motor 10, is a oil damper 30 in which a plate-like metal ring 32 and high viscosity oil 33 are sealed in a damper casing 31 which is attached on the lower end of the shaft 5. If the rotating velocity of the stepping motor 10 changes suddenly, a difference in velocity is produced between the damper casing 31 and the metal ring 32, so that the change of the velocity is damped by the viscosity of the oil 33 regardless of whether the velocity change is acceleration or deceleration.

The damper 30 described above is a so-called inertia viscosity type damper effectively using the inertia of the metal ring 32 and the viscosity of the coil 33, and develops a high damping effect on sudden changes of the rotating velocity of the stepping motor. However, the damper 30 has the following problems.

(a) The inertial load on the motor is increased considerably by the damper thereby offsetting increases in operating velocity. In order to compensate for the increase in inertia, it is necessary to increase the torque of the stepping motor. Accordingly, where it is desired to make the operating velocity high, the additional provision of the damper is likely to require an increase in the physical size of the motor.

(b) As may be seen from FIG. 5, the suppression of rotational fluctuations in the stepping motor through damping is effective during the period of high but constant velocity. It is, however, desirable to inhibit damping during low-velocity rotation. The damper is effective against any change in velocity in view of the operational principals thereof. Accordingly, operation velocity is apt to be reduced by the damper, particularly in the case where the distance of driven component movement is short.

(c) The additional provision of the damper increases the physical size of the stepping motor. Where the stepping motor is used for driving a head of a disk storage device, any increase in the axial size of the stepping motor is particularly disadvantageous.

The latter problem may be appreciated by reference to FIG. 8. In a thin disk storage device, the stepping motor 10 is attached to a casing 40 at a recessed portion thereof so as to be flush with a base plate 50. The thickness of the overall drive is thus kept to approximately one inch. The thickness of the stepping motor 10 is $\frac{1}{2}$ inch at the minimum. It is necessary, however, to house the mechanism (not shown) for coupling the stepping motor 10 to a head, for example, within the casing 40. Therefore, it is also difficult to further increase the depth of the recessed portion of the casing 40. Hence, if the damper is additionally mounted on the motor, the axial dimension of the overall drive is increased to accommodate the damper.

SUMMARY OF THE INVENTION

It is, therefore, an object of the present invention to provide a stepping motor in which rotational fluctuations are substantially removed as an impediment to increased operating velocity, and in which means for suppressing the rotational fluctuations can be easily incorporated in the stepping motor.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a stepping motor having a stationary portion, a rotary portion or component supported in the stationary portion, and a smoothing device constituted by an annular inertia member fixed on a circumferential edge portion of a flexible member made of a soft elastic body flexible in the direction of rotation of the stepping motor, the smoothing device being mounted by an inside portion of the flexible member to the rotary portion of the stepping motor.

An elastic rubber such as silicon rubber, is preferred for use as the elastic body of the flexible member. In order to insure that the flexible member will flex easily in the rotational direction parallel to the rotational direction of the rotor, an intermediate portion of the flexible member, between the inside mounting portion and the circumferential edge portion thereof, is made especially thin. Also, a plurality of windows may be punched in the intermediate portion and distributed uniformly in the circumferential direction thereof. The shape of the flexible member is preferably annular, and of a flat, inverted plate-like or dish-like configuration. It is further preferred that the inertia member is formed as a metal ring integrated with the flexible member by molding.

The smoothing device of the invention, thus constituted by the flexible member and the inertia member, can be mounted on the rotary shaft or the central portion rotor of the stepping motor. The inverted dish shape of the flexible member facilitates inclusion of the smoothing device within the casing of the motor. Also, by making the outer diameter of the smoothing device substantially coincident with the diameter of the rotor of the motor, the space occupied by the device does not significantly increase the size of the motor casing.

Further, according to the present invention, velocity dependency is given to the smoothing effect of the device by using the flat resonance characteristic determined by the elasticity of the soft elastic body of the flexible member, by the inertial efficiency of the inertia member, and by taking advantage of the fact that the quantity of energy stored in the inertia member increases in proportion to a square of the velocity of rotation. As a result, the effect of suppressing the rotational fluctuations is improved particularly at high velocity operation, and reaction forces supplied by the flexible member in the change of velocity of the motor at low velocity operation are reduced so as not to interfere with low speed operation for short intervals of time.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

DETAILED DESCRIPTION OF THE PREFERRED EMBODIMENTS

Figure 1:
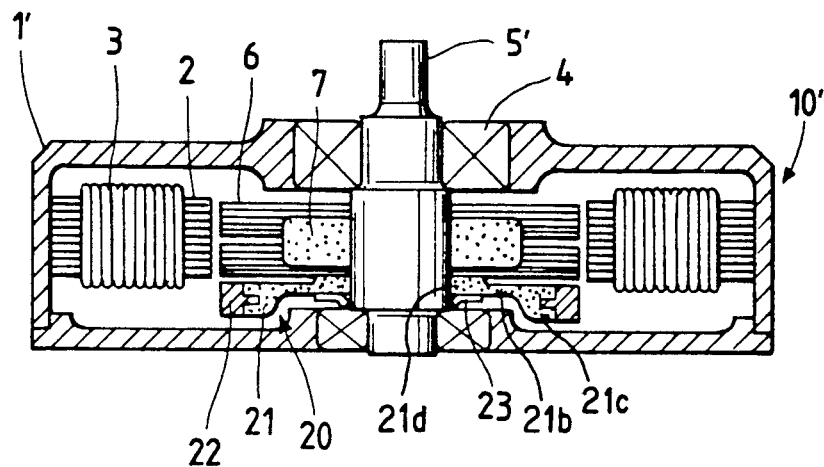
FIG. 1 is a sectional view of an embodiment of the stepping motor incorporating a smoothing device according to the present invention.
Figure 2:
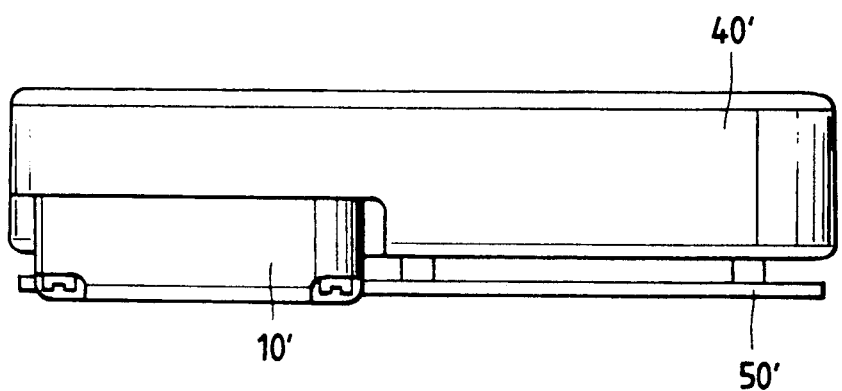
FIG. 2 is a side view of a disk storage device showing an example of the application of the stepping motor of the invention.

In FIGS. 1 through 4, the parts identical to those previously identified in FIGS. 5-8 are designated by the same reference numerals, and parts corresponding to those previously identified in FIGS. 5 through 8, but modified, are designated by the same reference numerals but primed. As shown in FIG. 1, a smoothing device 20, constituted by a flexible member 21 and an inertia member 22, is mounted on a shaft 5' while an inside or central hub portion 21a of the flexible member 21 is pressed against a central portion of the rotor iron core 6 of a stepping motor 10, by a thin dish-like plate spring 23. The elastic body of the flexible member 21 is preferably silicon rubber or the like which withstands a high temperature and deterioration over time. The elastic body is further selected as to rubber hardness, for example, of 30 degrees and so as to be highly flexible. The flexible member 21 is of disc-shaped configuration and preferably of inverted substantially dish-like configuration to facilitate incorporation of the flexible member 21 into the motor casing 1'. An intermediate portion 21b of the flexible member 21 is sufficiently thinner than its inside portion or its circumferential, edge portion 21c so that the flexible member 21 is easily flexed in torsion or in the direction parallel to the direction of rotation of the rotor core 6. It is preferable to select the thickness of the intermediate portion to be in a range from 0.5 to 1 mm. The flexibility of the member 21 can be further improved if circumferentially distributed windows or openings are formed through the intermediate portion.

It is preferable to use a thin metal ring, such as an iron ring or the like, having a thickness of about 1 mm, as the inertia member 22 so that a high inertia effect can be obtained. In order to use available space in the motor, it is advantageous to select the outer diameter of the inertia member 22 to be substantially equal to or a little smaller than the diameter of the rotor.

Further, in order to fix the inertia member 22 onto the circumferential edge portion of the flexible member 21, the flexible member 21 and the inertia member 22 are integrated with each other as illustrated in this embodiment by molding the flexible member 21 about the inertial ring. The thus integrated smoothing device 20 can be simply attached to the stepping motor 10' by pushing-in the plate spring 23 after the flexible member 21 has been mounted on the shaft 5'.

Figure 8:
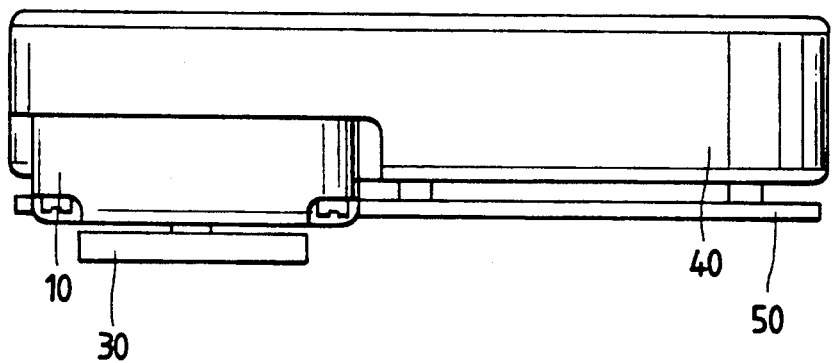

The stepping motor 10' provided with the smoothing body 20 incorporated therein is attached in a recessed portion of a casing 40' of a disk storage device in the same manner as in the conventional case as shown in FIG. 8 so that the under surface of the stepping motor 10' is flush with a base plate 50'. Thus, the thickness of the overall device can be held within a predetermined dimensional range, for example, within one inch.

Figure 3:
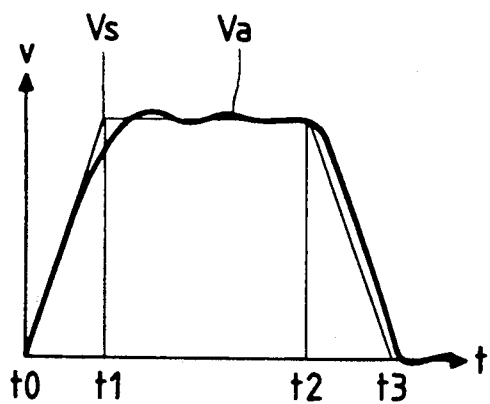
FIG. 3 is a diagram showing curves reflecting time versus operating velocity characteristics of the stepping motor.
Figure 4:
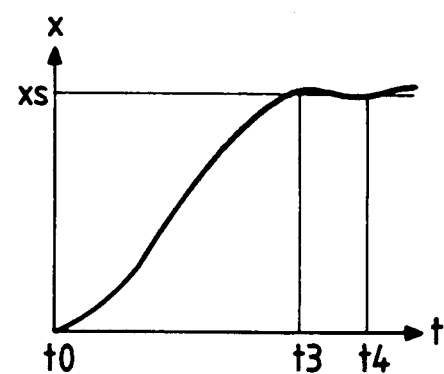
FIG. 4 is a diagram show a curve reflecting time versus operating duration characteristics of the stepping motor.
Figure 5:
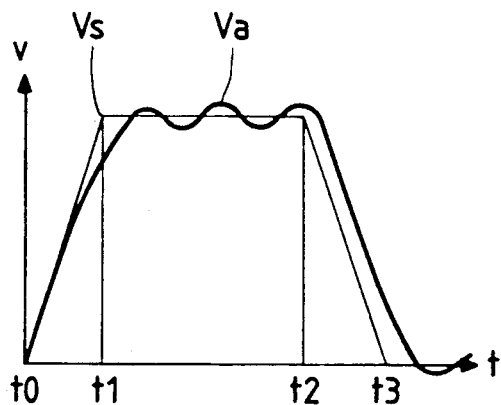
FIGS. 5-8 are illustrations corresponding to FIGS. 1-4 but representing a conventional stepping motor.
Figure 6:
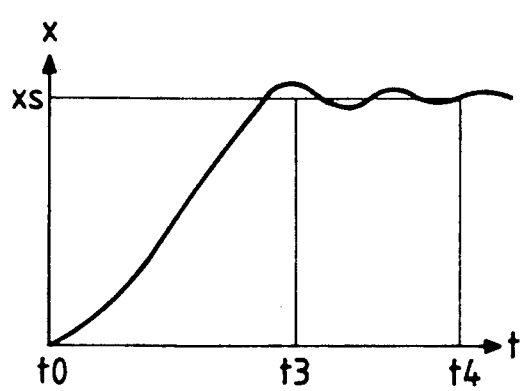
Figure 7:
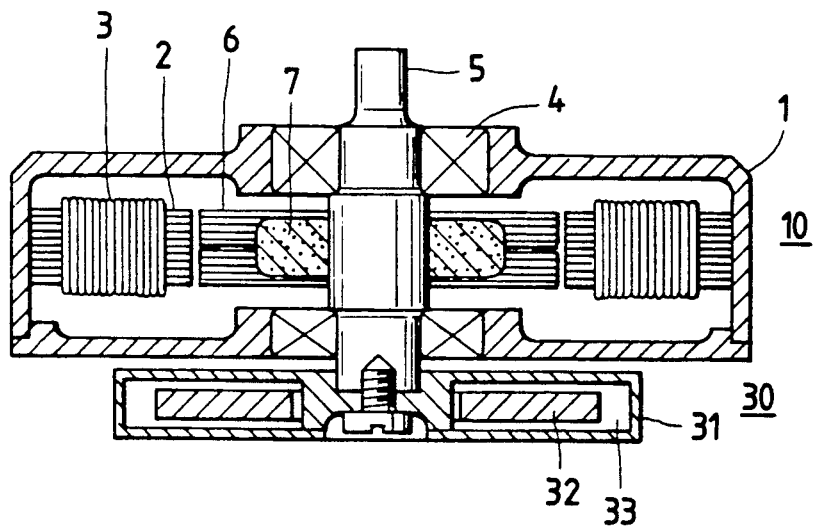

The smoothing device 20 according to the present invention smooths the rotation of the stepping motor 10' by using the elastic property of the flexible member 21 and the energy storage property of the inertia member 22, so that the rotational fluctuations of the stepping motor 10' can be effectively suppressed. FIGS. 3 and 4 show the state of the suppression of rotational fluctuations correspondingly to the aforementioned FIGS. 5 and 6.

As shown in FIG. 3, although a little wave is generated in the actual velocity Va of the head just after the time t1, the wave is suppressed in an extremely short time so that the difference between the actual velocity Va and the scheduled velocity Vs is substantially eliminated at the time t2. Accordingly, the delay in damping the head is significantly minimized by comparison with the conventional device (FIG. 5) so that the actual velocity Va at the movement-finish point of time t3 becomes substantially zero in accordance with the schedule.

As shown in FIG. 4, the movement distance x at the movement-finish point of time t3 is also substantially equal to the scheduled distance xs. Although the movement distance x goes over a little in this example, the oscillation of the head is very slight so that the head can become stable at time t4 or within a very short time thereafter.

In the embodiment described above, due to the soft elastic body of the flexible member 21, a considerably flat resonance characteristic can be obtained although the smoothing device 20 per se has a resonance point determined on the basis of the elasticity of the smoothing device 20 and the inertial efficiency of the inertia member 22. Therefore, there is no probability of occurrence of resonance at a specified frequency for switching the phase current vector of the stepping motor.

As described above, suitable velocity dependency is given to the rotation smoothing property of the smoothing device 20 to make high the rotational fluctuation suppressing effect in a high-velocity range, by utilizing such a gentle resonance characteristic and an energy-storage-quantity characteristic proportional to a square of the velocity of the inertia member 22. The characteristic with respect to the velocity fluctuations of the stepping motor in a low velocity range can be adjusted by selection of the elasticity or flexibility provided in the flexible member 21. By properly selecting the characteristic, it is possible to prevent the operating velocity or operation conformity from lowering and thereby improve the operational characteristic in comparison with the conventional case.

It is therefore apparent from the above description, the stepping motor of the present invention results in the following advantages.

(a) The smoothing device is embodied in a simple construction of the flexible member and the inertia member so as to be lighter in weight than the conventional damper, so that the magnitude of inertial forces added to the stepping motor by the smoothing device, is reduced as compared with the conventional case and so that the characteristics of operating velocity are improved.

(b) The smoothing device is of minimal size and can be easily mounted in the casing of the motor, so that the overall size of the stepping motor and the smoothing device is reduced by comparison with the conventional motor. Moreover, a disk storage device in which the stepping motor is incorporated can be made thinner.

(c) The rotation of the stepping motor is made smooth by the use of the elastic property of the flexible member of the smoothing device and the energy storage property of the inertia member of the same, so that the rotational fluctuations can be effectively reduced. Further, by properly selecting the elasticity of the flexible member, it is possible to adjust the resonance characteristic of the smoothing device, and by making the velocity dependency of the energy storage capacity of the inertia member in accord with the adjusted resonance characteristic, it is possible to make the rotational fluctuation suppressing effect in a high velocity range higher than that in the low velocity range.

(d) By selecting the flexibility of the elastic body of the flexible member so as to properly adjust the smoothing characteristic of the smoothing device against the velocity change in the low velocity range, it is possible to prevent reduced operating performance of the stepping motor in the low velocity range.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A stepping motor comprising a stationary component, a rotary component supported in said stationary component, a smoothing device comprising a flexible member having an inside hub portion and a circumferential edge portion, said flexible member being made of a soft elastic body flexible in a direction parallel to the direction of rotation of said rotary component, and an annular inertia member fixed on said circumferential edge portion of said flexible member, and means for mounting said smoothing device to a central portion of said rotary component.

2. A stepping motor comprising:

a casing;

a stator fixed in said casing;

a rotor having a shaft journalled for rotation in said casing and in a rotational direction relative to said stator; and a smoothing device including a disc-like, flexible member having a central hub portion fixedly connected to said rotor and a peripheral edge portion, and an annular inertia member fixed to said peripheral edge portion, at least an intermediate portion of said flexible member lying between said central hub portion and said peripheral edge portion being made of a soft elastic material thereby to impart flexibility in the connection of said inertia member to said rotor through said flexible member in a direction parallel to the rotational direction of said rotor.

3. The stepping motor of claim 2 wherein said smoothing device has a diameter approximating that of said rotor and is contained within said casing.

4. The stepping motor of claim 2 wherein said flexible member comprises a molded body of said soft elastic material.

5. The stepping motor of claim 4 wherein said molded body and said inertia member are shaped for connection by molding of said molded body.

6. The stepping motor of claim 2 wherein said intermediate portion of said flexible member is of an axial thickness in the range of from 0.5 mm to 1 mm.

7. The stepping motor of claim 6 wherein said flexible member is formed of silicon rubber.

* * * * *

UNITED STATES PATENT AND TRADEMARK OFFICE
CERTIFICATE OF CORRECTION

PATENT NO. : 5,124,601

DATED : June 23, 1992

INVENTOR(S) : Takashi Miyashita

It is certified that error appears in the above-identified patent and that said Letters Patent is hereby corrected as shown below:

On the Title page, item [54]
In the Title, change "STEEPING" to --STEPPING--.

Signed and Sealed this

Twenty-eighth Day of September, 1993

Attest:

BRUCE LEHMAN

*Attesting Officer*  *Commissioner of Patents and Trademarks*